United States Patent [19]
Robillard

[11] 4,206,017
[45] Jun. 3, 1980

[54] ELECTROGRAPHIC RECORDING PROCESS, MEANS AND APPARATUS

[75] Inventor: Jean J. Robillard, Ferney Voltaire, France

[73] Assignees: Laboratoires de Physicochimie Appliquee ISSEC, Ferney Voltaire; KDP—Societe anonyme Keller Dorian, Lyons, both of France

[21] Appl. No.: 926,942

[22] Filed: Jul. 21, 1978

[30] Foreign Application Priority Data

Jul. 22, 1977 [FR] France ............................... 77 22575

[51] Int. Cl.$^{2}$ ....................... B41M 5/20; G01D 15/34
[52] U.S. Cl. ........................................ 204/2; 346/165
[58] Field of Search .................. 346/165; 204/2, 4, 5, 204/6

[56] References Cited

U.S. PATENT DOCUMENTS

| | | | |
|---|---|---|---|
| 3,516,911 | 6/1970 | Hopps | 204/2 |
| 3,772,159 | 11/1973 | Sakata | 204/2 |
| 3,864,684 | 2/1975 | Shimuzu | 204/2 |
| 3,891,990 | 6/1975 | Wells | 346/165 |
| 4,012,292 | 3/1977 | Fujiwara | 346/165 |
| 4,035,244 | 7/1977 | Inque | 204/2 |
| 4,067,780 | 1/1978 | Fujiwara | 204/2 |

FOREIGN PATENT DOCUMENTS

| | | | |
|---|---|---|---|
| 2548896 | 6/1976 | Fed. Rep. of Germany | 204/2 |

*Primary Examiner*—John H. Wolff
*Attorney, Agent, or Firm*—Lewis H. Eslinger

[57] ABSTRACT

The invention relates to electrographic recording.

It relates to an electrographic recording process characterized by forming at least one permanent trace or mark by local injection of electrons by means of at least one marking electrode brought to negative potential in an electrosensitive layer containing grains of a color center-generating substance dispersed in an appropriate binder, said electrosensitive layer being supported by a layer which is a good conductor of electricity brought to a positive potential and containing a substance which is able to supply to the electrosensitive layer the same number of positive charges as electrons injected by the marking electrode.

The invention can be used in various recording implements.

10 Claims, 3 Drawing Figures

FIG. 2
FIG. 1
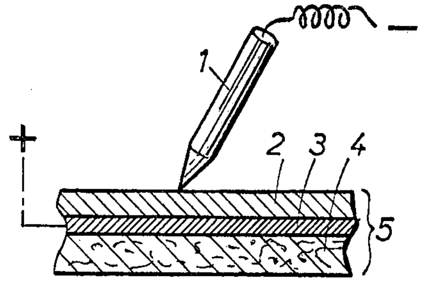
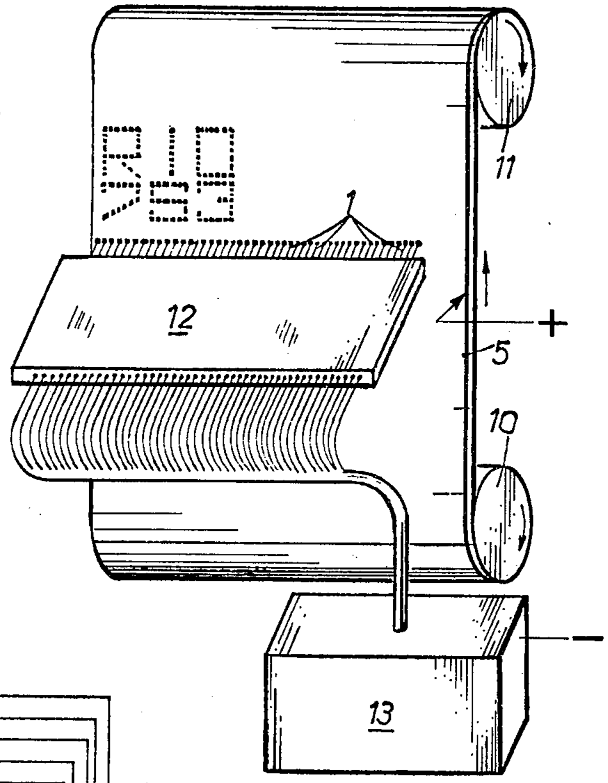
FIG. 3
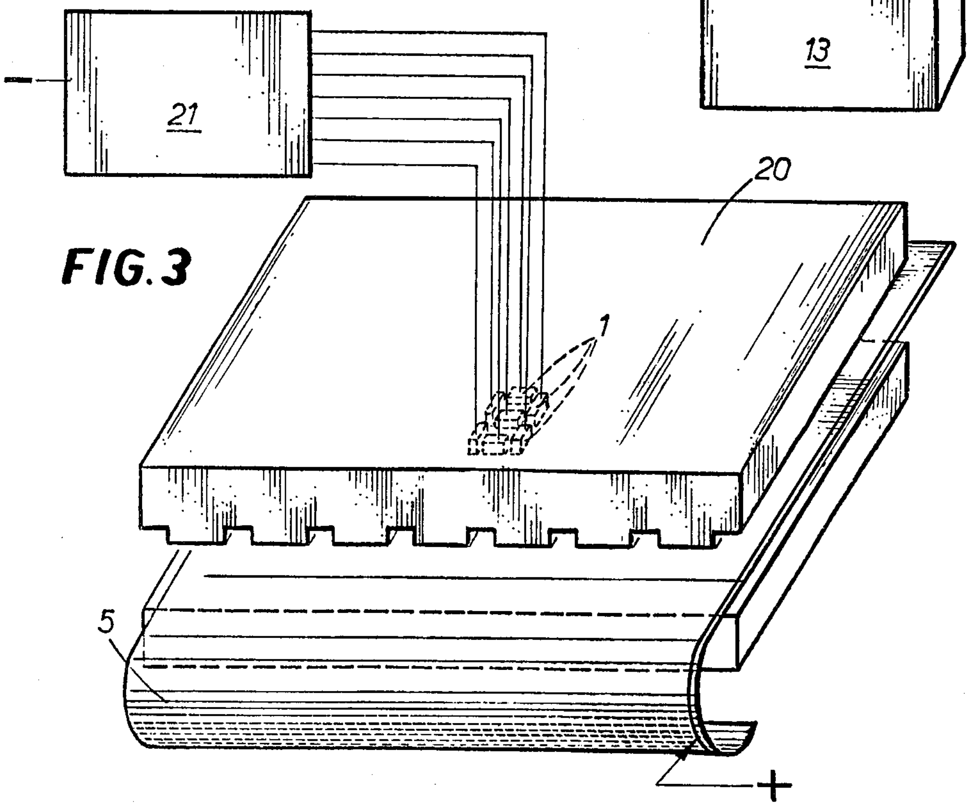

ELECTROGRAPHIC RECORDING PROCESS, MEANS AND APPARATUS

BACKGROUND OF THE INVENTION

The present invention relates to an electrographic recording process and means, as well as to apparatus for performing the same.

Various electrographic recording papers are at present available on the market (direct electrical recording by means of a stylus forming an electrode).

A first type of paper called sparking papers (such as Teledetos, Western, Union and Timefax papers) consist of a black base covered with white pigments which volatilise or carbonise under the action of an electrical spark caused by the signal to be recorded, and which lead to the appearance of a black mark on the paper. These papers have the advantage of operating dry but have the disadvantage of requiring a high voltage and of giving off unpleasant smells during recording.

A second type of paper consists of electrolytic papers (Mufax, Alden, Hogan) in which the passage of the current causes a chemical reaction leading to the formation of a dye. Various electrolytic mechanisms may be involved, the introduction of ions into the sensitive layer, reactions to the electrodes (cathodic reduction, anodic oxidation) and modification to the pH in the vicinity of the electrodes which may, for example, cause diazo-phenol coupling. Electrolytic papers have the advantage of functioning under a relatively low voltage but in particular have the disadvantage of requiring a high current and a high humidity level (necessity of keeping the paper in hermetically sealed boxes). Furthermore, both these types of papers have the disadvantage of having a limited recording speed due to the time necessary for, or for the transit of ions in the electrolyte of the paper.

A third type consists of dielectric papers functioning on the basis of an electrostatic process similar to Xerox or Electrofax-type photocopying processes. In the case of such papers an electrode raised to a high voltage produces a distribution of local electrostatic charges on an insulating paper. These charges are developed by the passage of the paper through a toner suspension, the latter then being fixed by heat treatment. These papers have the disadvantage of requiring the use of a high voltage, a toner and heat fixing. Moreover, the machines using the same are large, costly and require a high level of maintenance.

BRIEF SUMMARY OF THE INVENTION

The object of the present invention is to obviate the disadvantages encountered in the use of the prior art electrographic recording papers.

The invention relates to an electrographic recording process wherein at least one permanent trace or mark is formed by the local injection of electrons by means of at least one marking electrode brought to a negative potential, in an electrosensitive layer (a) containing grains of a substance which generates colour centres dispersed in an appropriate binder, said electrosensitive layer being supported by a layer which is a good conductor of electricity (b) brought to a positive potential and containing a substance able to supply to the electrosensitive layer positive charges in a number equal to that of the electrons injected by the marking electrode, layer (a) having an electrical conductivity which is sufficient to permit the passage of an electric current between the marking electrode and layer (b).

The invention also relates to a recording means for performing the process of the invention, wherein it comprises an upper electrosensitive layer (a) containing grains of a substance which generates colour centres dispersed in an appropriate binder ensuring the integrity of the layer, a layer (b) which is a good conductor of electricity containing a substance able to supply positive charges to the electrosensitive layer (a) and supporting said latter layer, and a substrate (c) carrying layers (b) and (a), layer (a) having an electrical conductivity which is adequate to permit the passage of an electrical current between the marking electrode and layer (b).

The substance which generates the colour centres of layer (a) is, according to the invention, a crystalline substance whose crystal lattice has a high density of vacant sites for negative ions able to trap electrodes. When an electron is trapped by such a vacant site it develops on an orbital determined by the wave function of the disturbed medium. This orbital induces an absorption band in the visible spectrum and therefore the vacant site-trapped electron system is called a colour centre.

Examples of colour centre-generating substances which can be used according to the invention are:

alkali metal and earth alkaline halides such as chlorides, bromides, fluorides and iodides of sodium, potassium, lithium, magnesium and calcium;

certain oxides of metals such as titanium dioxide, tin dioxide, zinc oxide, tungsten trioxide, molybdenum trioxide, tantalum pentoxide, nickel dioxide, magnesium oxide, cerium dioxide, lanthanum dioxide, barium oxide and strontium oxide;

certain salts such as lead chloride and zirconium titanate.

These substances can be used alone or in mixtures of two or more.

For illustrative purposes, it is pointed out that the size of the grains of colour centre-generating substance can be between 0.1 and 5 microns, and preferably is of the order of 0.3 micron.

Layer (a) must obviously have an electrical conductivity adequate for permitting the passage of an electrical current between the marking electrode and layer (b) which is a good conductor of electricity. An adequate electrical conductivity generally is obtained with a conductivity value between 1000 and 10,000 ohm/cm$^2$.

The electricity conducting layer (b) is a layer which contains a substance able to supply to layer (a) the same number of positive charges as there are electrons injected into layer (a) in order to retain the neutrality of the crystal of the colour centre-generating substance. Examples of substances able to supply positive charges to layer (a) are aluminium, silver oxide $Ag_2O$, bismuth, tin, antimony and manganese dioxide.

According to a preferred embodiment, layer (b) is formed from an aluminium layer deposited by vacuum evaporation on the surface of a sheet of paper serving as the substrate (c).

According to another preferred embodiment, layer (b) is formed from a dispersion of particles of a donor substance of positive charges and carbon particles in a suitable binder ensuring the integrity of layer (b). Preferably layer (b) is applied to a substrate (c) formed from a sheet of paper. This embodiment is particularly advantageous when the donor substance of the positive charges is not a good electrical conductor because the carbon particles improve the electrical conductivity of the layer.

For purely illustrative purposes, the size of the grains of the donor substance of positive charges and of the carbon in layer (b) can be between 0.1 and 3 microns, preferably approximately 0.3 micron.

Binders which can be used in layer (a) are preferably water-soluble polymers containing a high proportion of polar groups such as for example cellulose derivatives such as methylcellulose, hydroxyethylcellulose or carboxymethylcellulose, or polyfunctional polymers such as polyvinyl-alcohol or polyvinylpyrrolidone.

Binders which can be used in layer (b), when used, are for example acrylic resins such as the products sold under the trade names Pliolite SAV-B, SAV-C, VTAC-L of Goodyear; RP 1022 or GMS 264 of Monsanto; and E 202 of De Soto; styrene-butadiene copolymers such as the products sold under the trade names Cariflex of Shell-Chimie or Pliolite S5-B of Goodyear; or polyesters such as Cyzac XMR-1473-S of American Cyanamid. It is pointed out that the ratio of colour centre-generating substance to binder in layer (a) may vary from 3:1 to 8:1 based on the dry weight. Preference is given to a ratio of approximately 5:1.

When a dispersion of particles of a positive charge donor substance and carbon particles is used in layer (b) the ratio of positive charge donor substance to carbon may vary between 1:2 to 1:20.

These ranges of proportions are not limitative and it is possible to extend beyond the same without passing beyond the scope of the invention.

Layer (a) and layer (b), when the latter is constituted by a mixture of particles in a binder, may be applied in the form of a dispersion to a solution of the binder in a solvent by any known coating method, for example, with a small scraper, an air knife or dipping, followed by drying. Suitable solvents are, for example, hydrocarbons, ketones, polyalcohols such as toluene, and acetone as well as water. The solvent is chosen as a function of the binder used. In general layer (a) is applied in the form of an aqueous dispersion. After drying layer (a) will retain a certain proportion of water, for example approximately 9 to 20% water. The nature of substrate (c) is not critical and it can, for example, be paper or a film of plastics material.

In addition to the colour centre-generating substance and the binder, layer (a) may also contain ammonium salts such as ammonium citrate or nitrate in order to improve the electrical conductivity of layer (a), particularly when the colour centre-generating substance is an oxide. In addition, the quality and the maintenance of the electrical conductivity of layer (a) are advantageously improved by incorporating into its composition plasticisers of the binder. Usable plasticisers are, for example, polyalcohols with a relatively low molecular weight such as glycerine, ethylene-glycol, diethylene-glycol, triethylene-glycol and propylene-glycol. When polyvinyl-alcohol is used as the binder the preferred plasticiser is glycerine.

Recording takes place by the injection of electrons by means of at least one marking electrode. The electrode used may be of a punctiform type, i.e. in the form of a stylus or the like (for example in the form of small blocks). It generally comprises a substance which resists mechanical abrasion such as a metal like tungsten, molybdenum, tantalum etc. or tungsten carbide. It is possible to use one or several electrodes.

The positive potential can be applied to layer (b) in various ways, as will be obvious to the skilled expert. It can, for example, be applied by means of a member which perforates layer (a) in order to reach and establish direct contact with layer (b). However, it is also possible not to entirely cover layer (b) by means of layer (a) leaving a free strip on one of the edges of the recording means to which can be applied a roller or rubbing or sliding member which establishes contact. Furthermore, when the recording means is in the form of a bobbin or reel contact can be established at the start of the paper with the spindle of said bobbin or reel, which is thus insulated from the apparatus.

For initiative purposes it is pointed out that the voltage applied between the marking electrode and layer (b) may vary between 2 and 30 volts and the current intensity may vary between 10 $\mu$A and 10 mA.

The process and means according to the invention are particularly suitable for the recording of alpha-numeric characters. To this end it is possible to provide a recording apparatus having a plurality of electrodes bearing on a recording means in the form of a strip which unwinds between rollers and a commutating device which selectively transmits electrical signals to different electrodes of said plurality of electrodes in such a way as to form alphanumeric characters on the strip. As a variant it is possible to provide a recording apparatus having a matrix of electrodes bearing on a recording means in the form of a fixed sheet and a commutating device which selectrively transmits electrical signals to certain of the electrodes of the block in order to form alphanumeric characters on the means without the displacement of the latter.

BRIEF DESCRIPTION OF THE DRAWINGS

The following description with reference to non-limitative embodiments provides a better understanding of the present invention, details of which can in particular be gathered from the following drawings, where show:

FIG. 1, a diagrammatic view illustrating the process and means according to the invention;

FIG. 2, a diagrammatic view representing a recording apparatus according to the invention;

FIG. 3, a diagrammatic view showing another recording apparatus according to the invention.

DETAILED DESCRIPTION OF THE PREFERRED EMBODIMENTS

FIG. 1 illustrates the process and means according to the invention, and shows a punctiform marking electrode 1 whose point is in contact with an electrosensitive layer 2 containing grains of a colour centre-generating substance, said layer 2 being carried by a layer 3 which is a good conductor of electricity and which is itself carried by a substrate 4. Layers 2 and 3 and substrate 4 constitute the means according to the invention designated by the overall reference numeral 5.

Recording takes place in the following manner. The application of an electrical signal between electrode 1 and layer 3 of the means, layer 3 being positive and electrode 1 being negative, simultaneously produces an injection of electrons from electrode 1 into layer 2 and that of positive ions or holes from layer 3 into layer 2. A certain number of the injected electrons are trapped by vacant sites of the colour centre-generating substance of layer 2 leading to the creation of colour centres ensuring the formation of a coloured mark, whilst the positive ions or holes remain trapped at the interface of layers 2 and 3.

FIG. 2 shows a recording apparatus according to the invention permitting the recording of alphanumeric characters on the means according to the invention. This apparatus comprises a roller 10 for the supply of recording means 5 in the form of a strip, a drive roller 11 ensuring the unwinding of strip 5 at constant speed, and a plurality or group 12 of electrodes 1 in contact with strip 5, said electrodes being connected to a commutating device 13 permitting the selective transmission of electrical signals to the electrodes in such a way as to form alphanumeric characters on recording strip 5.

FIG. 3 shows another apparatus according to the invention permitting the recording of alphanumeric characters on means according to the invention. This apparatus comprises a matrix or block 20 of electrodes in the form of small parallelepipedic blocks bearing on a fixed recording means 5 in the form of a sheet, and a commutating device 21 permitting the selective transmission to certain electrodes such as 1 of electrical signals in order to form alphanumeric characters on the recording sheet 5.

The following non-limitative examples illustrate the preparation of the recording means according to the invention.

EXAMPLE 1

Preparation of a recording means comprising an electrosensitive layer applied to a layer which is a good conductor of electricity formed by an aluminium layer on a paper substrate.

A mixture with the following composition:

| | |
|---|---|
| titanium oxide (AT1 of Thann and Mulhouse) | 50 g |
| water | 66 g |

is placed in a ball mill for 24 hours and added to the following composition:

| | |
|---|---|
| polyvinyl-alcohol (Rhodoviol 4-20 of Rhone-Poulenc, 15% solution in water) | 66 g |
| ammonium nitrate | 6.6 g |
| glycerine | 5 g |

The resulting dispersion is applied to a paper substrate covered by vacuum evaporation of an aluminium layer at a rate of 20 g/m².

EXAMPLE 2

Preparation of a recording means comprising a first layer which is a good conductor of electricity deposited on a paper substrate and containing a mixture of particles of carbon and aluminium, and a second electrosensitive layer.

(a) Preparation of the first layer:

A mixture with the following composition:

| | |
|---|---|
| carbon black (Corax L of Degussa) | 70 g |
| aluminium powder | 10 g |
| ethyl acetate | 100 g |
| Acronal (B.A.S.F. resin) | 5 g |

is placed in the ball mill for 24 hours and added to the following composition:

| | |
|---|---|
| Acronal (B.A.S.F. resin) | 15 g |
| ethyl acetate | 300 g |

The resulting dispersion is applied at a rate of 12 g/m² to a paper substrate.

(b) Preparation of the second layer:

| | |
|---|---|
| A mixture with the following composition: | |
| tungsten oxide ($WO_3$) | 50 g |
| water | 66 g |

is placed in a ball mill for 24 hours and is added to the following composition:

| | |
|---|---|
| polyvinylpyrrolidone (NPK-30 of G.A.F., 30% solution in ethanol) | 27 g |
| ethanol | 53 g |
| ammonium nitrate | 6.6 g |
| glycerine | 10 g |

The resulting dispersion is applied to the first layer at a rate of 30 g/m².

EXAMPLE 3

The preparation of a recording means comprising an electrosensitive layer applied to a layer which is a good conductor of electricity formed from an aluminium layer on a paper substrate.

A mixture with the following composition:

| | |
|---|---|
| titanium oxide (AT1 of Thann and Mulhouse) | 40 g |
| tungsten oxide ($WO_3$) | 10 g |
| water | 66 g |

is placed in a ball mill for 24 hours and is added to the following composition:

| | |
|---|---|
| GMS 264 (Monsanto, 50% solution in ethanol) | 20 g |
| ethanol | 71 g |
| ammonium nitrate | 6.6 g |
| glycerine | 5 g |

The resulting dispersion is placed on a paper substrate covered by vacuum evaporation with an aluminium layer at a rate of 20 g/m².

EXAMPLE 4

Preparation of a recording means comprising a first layer which is a good conductor of electricity deposited on a paper substrate and containing a mixture of particles of carbon and silver oxide $Ag_2O$, and a second electrosensitive layer.

(a) Preparation of the first layer:

A mixture with the following composition:

| | |
|---|---|
| carbon black (Corax L of Degussa) | 70 g |
| silver oxide $Ag_2O$ | 10 g |
| Pliolite S-5 | 3 g |
| toluene | 100 g |

is placed in a ball mill for 24 hours and added to the following composition:

| | |
|---|---|
| Pliolite S-5 (Goodyear) | 20 g |
| toluene | 50 g |

The resulting dispersion is applied to a paper substrate at a rate of 10 g/m$^2$.

(b) Preparation of the second layer:

A mixture with the following composition:

| | |
|---|---|
| molybdenum oxide $MoO_3$ | 50 g |
| water | 66 g |

is placed in a ball mill for 24 hours and added to the following composition:

| | |
|---|---|
| polyvinyl-alcohol (Rhodoviol 4-20 of Rhone-Poulenc, 15% solution in water) | 66 g |
| ammonium nitrate | 6.6 g |
| glycerine | 5 g |

The resulting dispersion is applied to the first layer at a rate of 20 g/m$^2$.

EXAMPLE 5

Preparation of a recording means comprising a first layer which is a good conductor of electricity deposited on a paper substrate and containing a mixture of particles of carbon and silver oxide $Ag_2O$, and a second electrosensitive layer.

(a) Preparation of the first layer:

| A mixture with the following composition: | |
|---|---|
| - carbon black (Corax L of Degussa) | 75 g |
| - silver oxide $Ag_2O$ | 5 g |
| - Cyzac XMR-1473-S (American Cyanamid) | 5 g |
| - toluene | 50 g |

is placed in a ball mill for 24 hours and added to the following composition:

| | |
|---|---|
| - Cyzac XMR-1473-S (American Cyanamid) | 15 g |
| - toluene | 100 g |

The resulting dispersion is applied to a paper substrate at a rate of 12 g/m$^2$.

(b) Preparation of the second layer:

A mixture with the following composition:

| | |
|---|---|
| - titanium oxide (AT-1 of Thann and Mulhouse) | 30 g |
| - molybdenum oxide $MoO_3$ | 20 g |
| - water | 66 g |

is placed in a ball mill for 24 hours and added to the following composition:

| | |
|---|---|
| - ethanol | 71 g |
| - GMS 264 (Monsanto, 50% solution in ethanol) | 20 g |
| - ammonium nitrate | 6.6 g |
| - glycerine | 5 g |

The resulting dispersion is applied to the first layer at a rate of 20 g/m$^2$.

EXAMPLE 6

Preparation of a recording means comprising an electrosensitive layer applied to a layer which is a good conductor of electricity formed by an aluminium layer on a paper substrate.

A mixture with the following composition:

| | |
|---|---|
| tantalum pentoxide $Ta_2O_5$ | 50 g |
| water | 66 g |

is placed in a ball mill for 24 hours and added to the following composition:

| | |
|---|---|
| ethanol | 53 g |
| polyvinylpyrrolidone (NPK-30 of G.A.F., 30% solution in ethanol) | 27 g |
| ammonium nitrate | 6.6 g |
| glycerine | 10 g |

The resulting dispersion is applied to a paper substrate covered by vacuum evaporation with an aluminium layer at a rate of 30 g/m$^2$.

EXAMPLE 7

Preparation of a recording means comprising a first layer which is a good conductor of electricity deposited on a paper substrate and containing a mixture of particles of carbon and silver oxide $Ag_2O$, and a second electrosensitive layer.

(a) Preparation of the first layer:

A mixture with the following composition:

| | |
|---|---|
| carbon black (Corax L of Degussa) | 75 g |
| silver oxide $Ag_2O$ | 5 g |
| RP 1022 (Monsanto resin, 40% solution in ethanol) | 5 g |
| ethanol | 25 g |

is placed in a ball mill for 24 hours and added to the following composition:

| | |
|---|---|
| RP 1022 (40% solution in ethanol) | 75 g |
| ethanol | 75 g |

The resulting dispersion is applied to a paper substrate at a rate of 12 g/m$^2$.

(b) Preparation of the second layer:

A mixture with the following composition:

| | |
|---|---|
| barium oxide BaO | 30 g |
| tantalum pentoxide $Ta_2O_5$ | 20 g |
| water | 66 g |

is placed in a ball mill for 24 hours and added to the following composition:

| | |
|---|---|
| hydroxyethylcellulose (WPO9-L of Union Carbide, 10% solution in water) | 100 g |
| ammonium nitrate | 6.6 g |
| glycerine | 5 g |

The resulting dispersion is applied to the first layer at a rate of 25 g/m$^2$.

EXAMPLE 8

Preparation of a recording means comprising a first layer which is a good conductor of electricity deposited on a paper substrate, and containing a mixture of particles of carbon and aluminium, and a second electrosensitive layer.

(a) Preparation of the first layer:

A mixture with the following composition:

| | |
|---|---|
| carbon black (Degussa Corax L) | 75 g |
| aluminium powder | 5 g |
| Cariflex (Shell Chimie) | 3 g |
| toluene | 100 g |

is placed in a ball mill for 24 hours and added to the following composition:

| | |
|---|---|
| Cariflex (Shell Chimie) | 20 g |
| toluene | 50 g |

The resulting dispersion is applied to a paper substrate at a rate of 12 g/m$^2$.

(b) Preparation of the second layer:

A mixture with the following composition:

| | |
|---|---|
| titanium oxide (AT-1 of Thann and Mulhouse) | 40 g |
| cerium oxide $CeO_2$ | 10 g |
| water | 66 g |

is placed in a ball mill for 24 hours and added to the following composition:

| | |
|---|---|
| polyvinyl-alcohol (Rhodoviol 4–20 of Rhone-Poulenc, 15% solution in water) | 66 g |
| ammonium nitrate | 6.6 g |
| glycerine | 5 g |

The resulting dispersion is applied to the first layer at a rate of 20 g/m$^2$.

The characteristics of the recording means of Examples 1 to 8 are summarised in Table I.

TABLE I

| Examples | Intensity of recording current MA | Density of trace or mark | Colour of tarce or mark | Spread of trace or mark |
|---|---|---|---|---|
| 1 | 5 | 0.85 | brown | Yes |
| 2 | 0.5 | 1.3 | dark blue | No |
| 3 | 0.1 | 1.6 | black | Yes |
| 4 | 0.8 | 1.0 | dark green | No |
| 5 | 0.3 | 0.80 | black | No |
| 6 | 3 | 1.4 | black | No |
| 7 | 1 | 0.65 | black | a little |
| 8 | 10 | 0.6 | black | No |

1. Electrographic recording process wherein for the purpose of forming a permanent trace or mark on an electrosensitive layer grains on the order of between 0.1 and 5 microns of a colour centre-generating crystalline substance whose crystal lattice has a high density of vacant sites for negative ions to trap electrons are incorporated into said layer which is placed on a conducting layer in which is placed a material which is able to supply positive charges, locally injecting electrons into the electrosensitive layer by means of a marking electrode supplied with negative potential, and simultaneously injecting into said sensitive layer a number of positive charges equal to that of the electons, from the conductive layer by bringing the latter to a positive potential in such a way as to pass an electrical current through the sensitive layer between the marking electrode and the conducting layer.

2. A recording means comprising an upper electrosensitive layer (a) containing grains on the order of between 0.1 and 5 microns of a crystalline substance whose crystal lattice has a high density of vacant sites for negative ions to trap electrons, which substance generates colour centres in response to an electrical current therethrough and is dispersed in a binder ensuring the integrity of the layer, a layer (b) which is a good conductor of electricity containing a substance to supply positive charges to the electrosensitive layer (a) and supporting said latter layer, and a substrate (c) carrying layers (b) and (a), layer (a) having an electrical conductivity to permit the passage of an electrical current therethrough between a marking electrode and layer (b).

3. A recording means according to claim 2, wherein the colour centre-generating substance is selected from chlorides, bromides, fluorides and iodides of sodium, potassium, lithium, magnesium and calcium; titanium dioxide, tin dioxide, zinc oxide, tungsten trioxide, molybdenum trioxide, tantalum pentoxide, nickel dioxide, magnesium oxide, cerium dioxide, lanthanum dioxide, barium oxide and strontium oxide; lead, chloride and zirconium titanate.

4. A recording means according to claim 2, wherein the good electricity conducting layer contains as the substance able to supply positive charges a substance chosen from aluminium, silver oxide, bismuth, tin, antimony and manganese dioxide.

5. A recording means according to claim 4, wherein the good electrical conducting layer is formed from an aluminium layer.

6. A recording means according to claim 4, wherein the good electrical conducting layer is formed from a dispersion of particles of a substance able to supply positive charges and of particles of carbon in a binder.

7. A recording means according to claim 2, wherein the substrate is formed by a paper sheet or a film of plastics material.

8. A recording means of claim 2, wherein said marking electrode comprises a plurality of electrodes bearing on said electrosensitive layer and a commutating device permitting the selective transmission of electrical signals to the different electrodes.

9. A recording apparatus according to claim 8, wherein the electrodes are aligned on a fixed group and wherein means are provided for displacing the recording means relative to the electrodes.

10. A recording apparatus according to claim 8, wherein the electrodes are disposed in a fixed electrode matrix and wherein the recording means is also fixed during recording.

* * * * *